(12) United States Patent
Wang et al.

(10) Patent No.: US 10,038,593 B2
(45) Date of Patent: Jul. 31, 2018

(54) METHOD AND SYSTEM FOR RECOVERING VIRTUAL NETWORK

(71) Applicant: Sangfor Technologies Company Limited, Shenzhen (CN)

(72) Inventors: Huangfeng Wang, Shenzhen (CN); Jian Lei, Shenzhen (CN)

(73) Assignee: SANGFOR TECHNOLOGIES INC., Shenzhen (CN)

(*) Notice: Subject to any disclaimer, the term of this patent is extended or adjusted under 35 U.S.C. 154(b) by 130 days.

(21) Appl. No.: 15/096,353

(22) Filed: Apr. 12, 2016

(65) Prior Publication Data

US 2016/0306710 A1 Oct. 20, 2016

(30) Foreign Application Priority Data

Apr. 15, 2015 (CN) .......................... 2015 1 0179300

(51) Int. Cl.
*G06F 11/00* (2006.01)
*H04L 12/24* (2006.01)

(52) U.S. Cl.
CPC ...... *H04L 41/0816* (2013.01); *H04L 41/0856* (2013.01); *H04L 41/12* (2013.01)

(58) Field of Classification Search
CPC ............. G06F 11/2033; G06F 11/2028; G06F 11/2038; G06F 11/2046; G06F 11/1464; G06F 11/1451; G06F 11/1469; G06F 11/1484; H04L 69/40; H04L 49/70; H04L 41/0654; H04L 41/0816; H04L 41/0672
See application file for complete search history.

(56) References Cited

U.S. PATENT DOCUMENTS

| | | | | |
|---|---|---|---|---|
| 7,934,119 | B2* | 4/2011 | Takamoto | G06F 11/2028 714/15 |
| 8,352,778 | B2* | 1/2013 | Takamoto | G06F 11/2028 714/15 |
| 8,635,351 | B2* | 1/2014 | Astete | G06F 9/45533 709/215 |
| 8,972,978 | B2* | 3/2015 | Astete | G06F 9/45533 718/1 |
| 9,052,933 | B2* | 6/2015 | Astete | G06F 9/45533 |
| 9,304,873 | B2* | 4/2016 | McElhoe | G06F 11/1484 |
| 2012/0096158 | A1* | 4/2012 | Astete | G06F 9/45533 709/225 |

(Continued)

FOREIGN PATENT DOCUMENTS

| | | |
|---|---|---|
| CN | 101043380 A | 9/2007 |
| CN | 101479702 A | 7/2009 |

(Continued)

*Primary Examiner* — Nadeem Iqbal
(74) *Attorney, Agent, or Firm* — Anova Law Group, PLLC (57) ABSTRACT

The present invention provides a method and system for recovering a virtual network. The method may include obtaining a snapshot of the virtual network; and in a preset mode, reading configuration information of the virtual network from the snapshot. Further, based on the configuration information, one or more virtual network devices may be created and corresponding configuration parameters to the one or more created virtual network devices may be distributed. Based on the snapshot, the one or more created virtual network devices may be connected to virtual machines and a physical network.

17 Claims, 4 Drawing Sheets

(56) References Cited

U.S. PATENT DOCUMENTS

| | | | |
|---|---|---|---|
| 2013/0144744 A1* | 6/2013 | Astete | G06F 9/45533 705/26.1 |
| 2013/0290506 A1* | 10/2013 | Astete | G06F 9/45533 709/223 |
| 2013/0290960 A1* | 10/2013 | Astete | G06F 9/45533 718/1 |
| 2014/0317059 A1 | 10/2014 | Lad et al. | |
| 2015/0378839 A1* | 12/2015 | Langouev | G06F 11/1464 714/19 |
| 2016/0306710 A1* | 10/2016 | Wang | H04L 41/0816 |

FOREIGN PATENT DOCUMENTS

| | | |
|---|---|---|
| CN | 101876883 A | 11/2010 |
| CN | 103326877 A | 9/2013 |

\* cited by examiner

METHOD AND SYSTEM FOR RECOVERING VIRTUAL NETWORK

CROSS-REFERENCES TO RELATED APPLICATIONS

This application claims the priority of Chinese Patent Application No. 201510179300.5, entitled "method and system for recovering virtual network", filed on Apr. 15, 2015, the entire contents of which is incorporated herein by reference.

FIELD OF THE DISCLOSURE

The present disclosure relates to the field of computer network technologies and, more particularly, relates to a method and system for recovering virtual network.

BACKGROUND

With the development of network technologies, virtual networks have been widely used. When physical network devices are virtualized to be used in an SDN (Software Defined Network), the SDN includes not only switches, routers, load balancers, firewalls and other network devices that exist in a physical network, but also switches, routers, load balancers, firewalls and other virtual network devices that exist in a distributed virtual network. The boundaries among all virtual network devices often lack visibility and cannot be clearly distinguished. Before making any configuration adjustments on a virtual network, it may be difficult to assess the impact on the virtual network brought by the configuration adjustments. Thus, it is urgent to solve the problems of how to ensure changes on virtual network configurations not to cause undesired effects on the virtual network, and how to quickly recover even when the undesired affects occur.

The disclosed method and system are directed to solve one or more problems set forth above and other problems.

BRIEF SUMMARY OF THE DISCLOSURE

One aspect of the present disclosure provides a method for recovering a virtual network. The method may include obtaining a snapshot of the virtual network; and in a preset mode, reading configuration information of the virtual network from the snapshot. Further, based on the configuration information, one or more virtual network devices may be created and corresponding configuration parameters to the one or more created virtual network devices may be distributed. Based on the snapshot, the one or more created virtual network devices may be connected to virtual machines and a physical network.

Another aspect of the present disclosure provides a system for recovering a virtual network including one or more processors. The one or more processors may be configured to obtain a snapshot of the virtual network; and in a preset mode, read configuration information of the virtual network from the snapshot. Further, based on the configuration information, one or more virtual network devices may be created and corresponding configuration parameters to the one or more created virtual network devices may be distributed. Based on the snapshot, the one or more created virtual network devices may be connected to virtual machines and a physical network.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
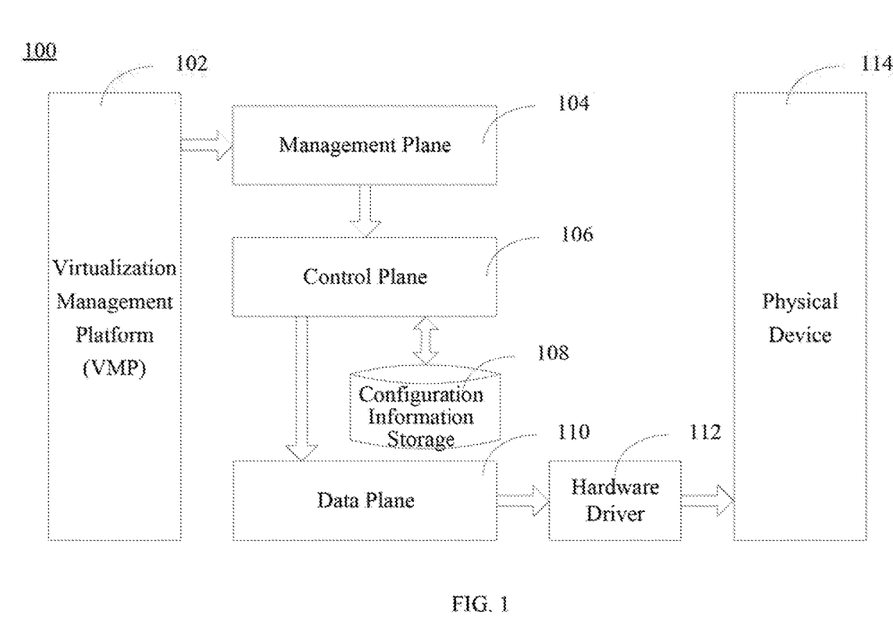
FIG. 1 illustrates a system architecture diagram of an exemplary virtual network consistent with various embodiments in the present disclosure.

The present disclosure provides a method that may be applied in a system having a system architecture as shown in FIG. 1. As shown in FIG. 1, system 100 may implement a layered design, and may include a virtualization management platform (VMP) 102, a management plane 104, a control plane 106, a configuration information storage 108, a data plane 110, hardware drivers 112, and physical devices 114.

The virtualization management platform 102 may be configured to integrate virtual machines, virtual networks, virtual storages, etc.; and to create and manage virtual network devices in an SDN (Software Defined Network) and/or an NFV (Network Function Virtualization) environment through a hypervisor.

As used herein, a virtual machine may refer to a virtual computer system that provides complete functionalities of a physical computer system. Each virtual machine may include a processor, a memory, a network device, a storage device, and a BIOS. As used herein, a hypervisor may refer to an intermediate software layer running between a physical server and one or more operating systems. The hypervisor may be configured to facilitate multiple operating systems and applications to share a same set of physical hardware, and to coordinate the access to all physical devices in the physical server and all virtual machines hosted on the physical server.

The virtualization management platform 102 may be configured to perform various procedures to configure the virtual network, such as using a topology diagram, commands, tables, etc. Configuring a virtual network may include configuring virtual network devices (e.g., types and numbers of virtual network devices that needs to be used), connecting relationships of the virtual network, and parameters of the virtual network devices (e.g., portals, protocols, rules, etc.). A virtual network device may be a virtual networking device that facilitates communications and interactions among devices in the virtual network, such as a virtual switch, a virtual router, a virtual firewall, etc. For example, in the virtual network, data traffic among virtual machines may be routed using virtual switches along with virtual routers and virtual firewalls for network segmentation and data isolation. A virtual network device may be connected with another virtual network device and/or one or more virtual machines. Further, devices in the virtual network may be connected to a physical network through a virtual network device.

The management plane 104 may be configured to receive a user action, and based on the user action, to distribute a corresponding information to the control plane 106. The user action may be, for example, selecting a snapshot. The control plane 106 may be configured to, when receiving the information distributed by the management plane 104, generate a corresponding operation command, and may distribute the operation command to various data nodes. The operation command may include, for example, creating a virtual switch, creating a virtual router, etc.

The configuration information storage 108 may be configured to store configuration information of the virtual network, and may be maintained by the control plane 106. The control plane 106 may be configured to save the information distributed by the management plane 104 to the configuration information storage 108, and obtain a desired rollback snapshot from the configuration information storage 108. The data plane 110 may be configured to communicate with the physical devices 114 through the hardware drivers 112. Thus, functions such as virtual switch, virtual router, virtual firewall may be implemented.

Figure 2:
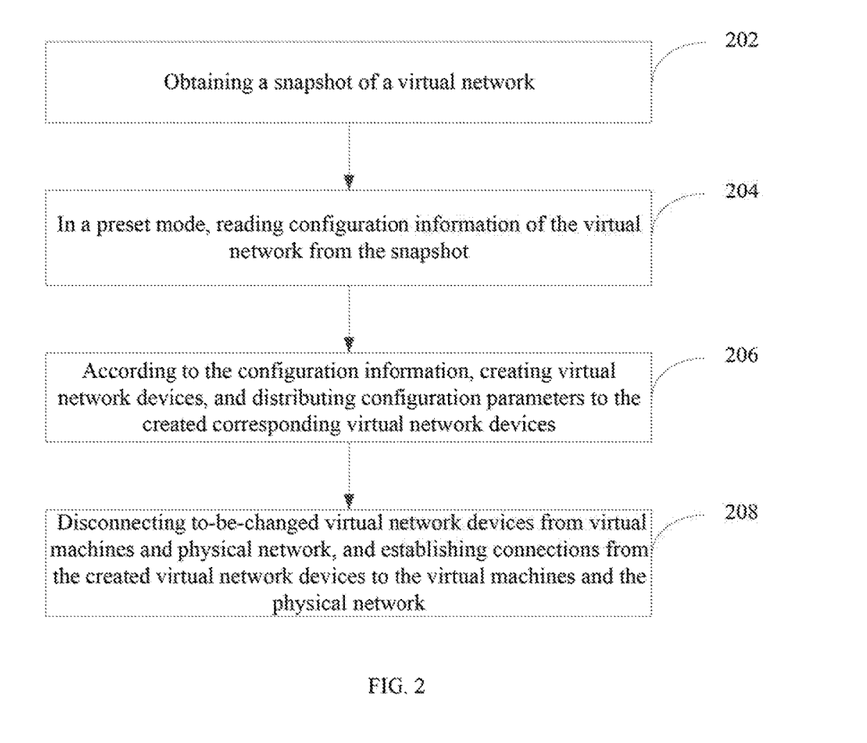
FIG. 2 illustrates a flow chart of an exemplary process for recovering a virtual network consistent with various embodiments in the present disclosure.

The present disclosure provides a method for recovering a virtual network. An exemplary method may be implemented in, for example, the system shown in FIG. 1. As shown in FIG. 2, the exemplary method may include the following steps.

Step 202: A snapshot of a virtual network may be obtained (e.g., from the configuration information storage 108 by the control plane 106).

The snapshot may refer to a complete set of configuration information of a VMP at a certain time stamp. A desired rollback snapshot of the virtual network may be obtained according to user needs. Using the information saved in the snapshot, the configurations of the VMP may be recovered to a state at any time stamp. For example, the user may be provided with a plurality of selections for snapshots labeled with timestamps and/or tags. A tag may indicate one or more characteristics of a snapshot, such as usage occasion, creator, etc. The control plane 106 may obtain a user action of selecting a timestamp or tag, and retrieve the corresponding snapshot from the configuration information storage 108.

Step 204: In a preset mode, the configuration information of the virtual network may be read from the snapshot. For example, when the snapshot is obtained according to user selection, the system 100 (e.g., VMP 102) may enter the preset mode and initiate the process of rolling back the snapshot.

The preset mode may refer to a mode that prevents a user from changing network configurations in the process of creating a snapshot or performing a rollback process based on a snapshot. The preset mode may be, for example, a maintenance mode of the virtual network. Reading the configuration information of the virtual network in the preset mode may ensure that the desired snapshot selected by the user is successfully carried out (e.g., without unexpected configuration changes during the rollback process).

For example, in the preset mode, a user is not allowed to add or delete a virtual network device, or change configuration parameters of existing virtual network devices externally. The virtual machines and the existing virtual network devices in the current virtual network may still run and function normally.

The configuration information of the virtual network may be obtained from the snapshot. Specifically, the configuration information may include information about virtual network devices (e.g., number and type of virtual network devices), configuration parameters of each virtual network device, etc. Further, when the virtual network is configured using a topology diagram, relative positions of the virtual network devices in the topology diagram may be obtained.

Step 206: According to the configuration information, virtual network devices may be created (e.g., by the VMP 102 through a hypervisor), and corresponding configuration parameters of the created virtual network devices may be distributed.

The virtual network devices may be created based on the information about virtual network devices in the configuration information. The created virtual network devices may be the same as the virtual network devices in the snapshot. The configuration parameters of the created virtual network devices may be distributed according to the configuration parameters of virtual network devices in the snapshot. The virtual network devices may include one or more virtual switch, one or more virtual router, one or more virtual load balancer, one or more virtual firewall, etc.

In some embodiments, when a physical host has a low capacity or has insufficient memory, the virtual network devices may not be completely recovered. In other words, some of the virtual network devices may not be created accordingly. For example, the desired virtual network may include 10 virtual network devices. Due to insufficient memory of the physical host, six of the virtual network devices may be recovered, and four of them may not be recovered. Such a recovery may not be useful to the virtual network as a whole. At this time, the operations of creating the six virtual network devices may need to be rolled back. The system may exit the preset mode, and inform the user that the recovery (i.e., rolling back based on the selected snapshot) is failed.

In some embodiments, multiple virtual network devices may already exist in the virtual network before the recovery process. The snapshot may include some virtual network devices that have the same configurations and settings as the existing ones, some virtual network devices that have different configurations than the existing ones, and/or some virtual network devices that are absent in the existing virtual network. In one example, the system may create virtual network devices in the snapshot regardless of existing ones (e.g., all ten virtual network devices in the desired virtual network).

That is, existing virtual network devices may all be referred as to-be-changed virtual network devices. In another example, the system may identify one or more existing virtual network devices that have same configuration parameters and connecting relationships as identified in the snapshot. That is, the system may keep the identified virtual network devices (e.g., two existing virtual network devices) and just create virtual network devices other than the identified ones according to the snapshot (e.g., creating the remaining eight virtual network devices). Further, existing virtual network devices other than the identified and kept ones may be referred as to-be-changed virtual network devices.

Step 208: The system may disconnect one or more to-be-changed virtual network devices from virtual machines and the physical network. Further, connections from the created virtual network devices to the virtual machines and the physical network may be established based on the snapshot.

The to-be-changed virtual network devices may include actively-changing virtual network devices (e.g., a user initiates an adjustment on a virtual network device) and passively-changing virtual network devices (e.g., a virtual network device that needs reset/adjustment when a network error occurs).

Before recovering the virtual network, an actively-changing virtual network device may remain connected to the virtual machines and the physical network. The adjustments initiated by the user on this virtual network device may impose certain impacts on the virtual network or may have already affected the virtual network. The actively-changing virtual network device may first be disconnected from the virtual machines and the physical network. According to the configuration information in the snapshot, the created virtual network device(s) may then be connected with the virtual machines and the physical network. In such a manner, the rollback of the snapshot may be implemented and the virtual network may be restored.

For a passively-changing virtual network device, such as a virtual network device that needs reconfiguration/reset when a network error occurs due to physical host failure, its connections to the virtual machines and the physical network may already be broken, or some connections may remain online. The passively-changing virtual network device may first be disconnected with the virtual machines and the physical network. Further, according to the configuration information in the snapshot, the created virtual network device may then be connected with the virtual machines and the physical network. In such manner, the rollback of the snapshot may be implemented and the virtual network may be restored.

Further, the snapshot may be used for virtual network deployment. Specifically, in a network environment where no virtual network devices have been connected, the snapshot may be used to create virtual network devices and to distribute corresponding configuration parameters to the created virtual network devices. As no virtual network devices have been connected in the current network environment, the connections from the virtual network devices to the virtual machines and the physical network may be directly established according to the snapshot (e.g., without the disconnection process). In such manner, the snapshot rollback may allow quick deployment of a virtual network.

In an exemplary embodiment, a snapshot of a virtual network may be obtained. Configuration information of the virtual network may be obtained from the snapshot. Virtual network devices may be created based on the configuration information, and corresponding configuration parameters of the created virtual network devices may be distributed. The to-be-changed virtual network devices may be disconnected from virtual machines and physical network. The created virtual network devices may be connected to virtual machines and the physical network based on the snapshot. The configuration information may be obtained in the preset mode so that users may not be able to make configuration changes during the snapshot rollback process, ensuring the virtual network recovery rolls back the desired snapshot. In some embodiments, in the preset mode, normal functions and procedures executed by the virtual machines may not be interrupted. Existing virtual network devices may also function normally, unless some of them may be identified as to-be-changed virtual network devices and disconnected from the virtual machines in the snapshot rollback process. In other words, the preset mode may ensure both minimum interruption to the normal work flow of the virtual network and no interruption to the snapshot rollback process.

Further, according to the configuration information obtained from the snapshot, virtual network devices may be created and corresponding configuration parameters may be distributed. The to-be-changed virtual network devices may be disconnected from the virtual machines and the physical network. The created virtual network devices may be connected to the virtual machines and the physical network according to the snapshot. Thus, the virtual network may be quickly recovered according to a pre-stored snapshot. Further, when a physical host fails, the virtual network may also be quickly restored according to the snapshot. The service interruption time period may be shortened, and recovery capabilities from network disaster may be improved effectively.

In one embodiment, before the step of obtaining the snapshot of the virtual network, the disclosed method may further include: creating a snapshot of a virtual network, and/or distribute the snapshot through a physical network or a physical medium. The physical network may refer to network built on physical devices through wired or wireless connections. The physical medium may refer to a non-transitory storage medium such as CD, ROM, etc.

In some embodiments, the snapshot of the virtual network may be created based on a user's own specific needs, or may be a default snapshot created by a manufacturer or a service provider.

In one embodiment, the step of creating the snapshot of the virtual network may include: collecting configuration parameters of virtual network devices and connection relationships among the virtual network devices and the virtual machines; and saving the configuration parameters and the connection relationships in the form of a snapshot. Creating the snapshot in the preset mode may prevent the users from changing the configurations of the virtual network during the process of snapshot creation.

The virtual network may be configured in various ways, such as using a topology diagram, commands, tables, etc. In one embodiment, the virtual network may be configured using a topology diagram. The configuration information of a virtual network may further include configuration parameters and locations in the topology diagram configured in the virtual network.

Figure 3:
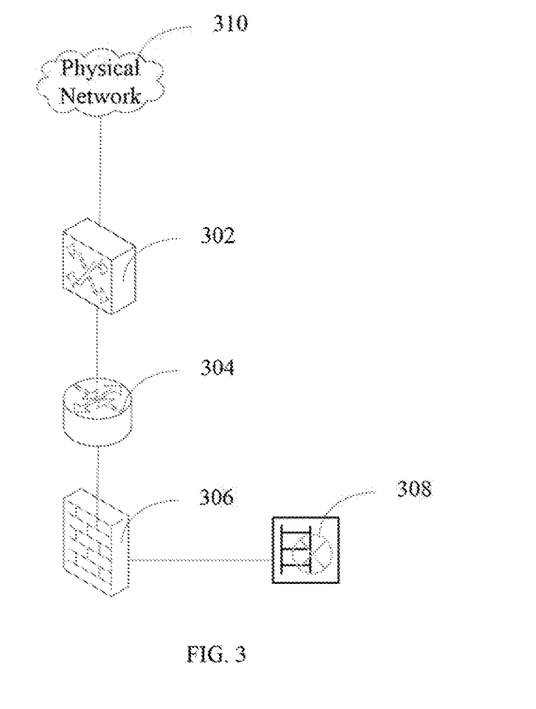
FIG. 3 illustrates an exemplary topology diagram of a virtual network consistent with various embodiments in the present disclosure.

FIG. 3 illustrates an exemplary topology diagram consistent with various embodiments in the present disclosure. As shown in FIG. 3, the exemplary topology diagram may include a virtual switch 302, a virtual router 304, a virtual firewall 306, an application load 308, and a physical network 310. The virtual switch 302 may be connected with the virtual router 304. The virtual router 304 may be connected with the virtual firewall 306. The virtual firewall 306 may be connected with the application load 308. Further, multiple application loads 308 may be running simultaneously. The virtual switch 302 may be connected with the physical network 302, such that the functions of the virtual switch 302, the virtual router 304, the virtual firewall 306, and the application load(s) 308 may be implemented. By creating a snapshot, configuration information of a virtual network that is commonly used or catered to user preferences may be backed up, and may facilitate virtual network recovery or virtual network deployment afterwards.

In some embodiments, the step of distributing the snapshot through a physical network or a physical medium may further include: distributing a snapshot released by the manufacturer through a physical network or a physical medium to a corresponding virtual network; or distributing a snapshot created by a user through a physical network or a physical medium to a corresponding virtual network. For example, the snapshot may be a virtual network snapshot released by a manufacturer, or a virtual network snapshot created by a user himself/herself based on user habits.

The distribution of the snapshot may be performed in various ways, such as network sharing, making copies in a physical medium, etc. For example, the manufacturer may store snapshots in a cloud server. In response to a request from a user, the cloud server may send the requested snapshot to the corresponding virtual network through a physical network. In another example, the manufacturer may store the snapshots in a physical medium. Users may obtain a desired snapshot from the physical medium. The desired snapshot may be loaded to the VMP 102, such that the snapshot is distributed to the corresponding virtual network. The snapshots released by the manufacturer may facilitate users to recover or deploy the virtual network with default virtual network configurations, and may ensure smooth operation of the virtual network.

The snapshots pre-created by the users may take various storage forms and should not be limited. The snapshots may be stored in a server in a physical network, or may be stored in a physical medium through the Hypervisor in the VMP 102. The desired snapshot may be distributed to the corresponding virtual network by network sharing through the physical network or by copying from the physical medium. The snapshot pre-created by the user may be applied by the user himself/herself, and may be shared with other users. That is, the virtual network recovery or deployment may be carried out conveniently according to user habits. Further, the snapshots may be shared with other users.

In one embodiment, after a to-be-changed virtual network device is disconnected with virtual machines and the physical network, and connections from the created virtual network devices to the virtual machines and the physical network are established based on the snapshot, the method may further include: deleting the to-be-changed virtual network device and existing the preset mode.

That is, when the connections from the created virtual network devices to the virtual machines and the physical network are established, the to-be-changed virtual network device may be deleted to save storage space. When the system exits the preset mode, the virtual network may resume operation at the recovered state. Further, if the virtual network is configured using a topology diagram, when the previously-described connections are established, relative position relationships among the virtual network devices in the topology diagram may be configured according to the snapshot, thus the virtual network may be recovered completely.

Figure 4:
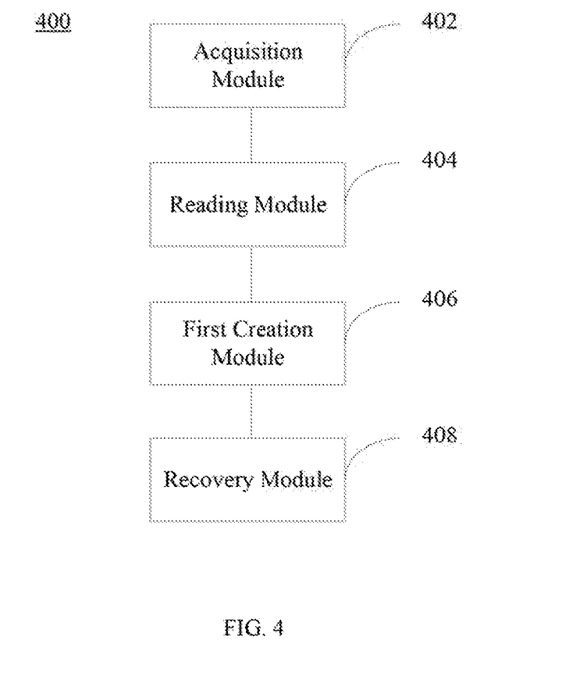
FIG. 4 illustrates a structural diagram of an exemplary system for recovering a virtual network consistent with various embodiments in the present disclosure.

The present disclosure further provides a system for recovering a virtual network. As shown in FIG. 4, an exemplary system 400 may include an acquisition module 402, a reading module 404, a first creation module 406, and a recovery module 408. The exemplary system 400 may be implemented, for example, in a system architecture shown in FIG. 1.

The acquisition module 402 may be configured to obtain a snapshot of a virtual network. The reading module 404 may be configured to: in a preset mode, read configuration information of the virtual network from the snapshot.

The first creation module 406 may be configured to: create virtual network devices according to the configuration information, and distribute corresponding configuration parameters of the created virtual network devices.

The recovery module 408 may be configured to: disconnect one or more to-be-changed virtual network devices from virtual machines and the physical network; and establish connections from the created virtual network devices to the virtual machines and the physical network according to the snapshot.

The configuration information may be obtained in the preset mode so that users may not be able to make configuration changes during the snapshot rollback process, ensuring the virtual network recovery rolls back the desired snapshot. According to the configuration information obtained from the snapshot, virtual network devices may be created and corresponding parameters may be distributed. Further, the to-be-changed virtual network devices may be disconnected from virtual machines and physical network. The created virtual network devices may be connected to the virtual machines and the physical network according to the snapshot. Thus, the virtual network may be quickly recovered according to a pre-stored snapshot. Further, when a physical host fails, the virtual network may be quickly recovered according to the snapshot. The service interruption time may be shortened, and recovery capabilities from network disaster may be improved effectively.

Further, the snapshot may be used for virtual network deployment. Specifically, in a network environment where no virtual network devices have been connected or created, the first creation module 406 may be configured to use the snapshot for creating virtual network devices and distributing corresponding parameters to the created virtual network devices. As no virtual network devices have been connected in the current network environment, the recovery module 406 may directly establish connections from the virtual network devices to virtual machines and the physical network. In such manner, the snapshot rollback process may allow quick deployment of a virtual network.

Figure 5:
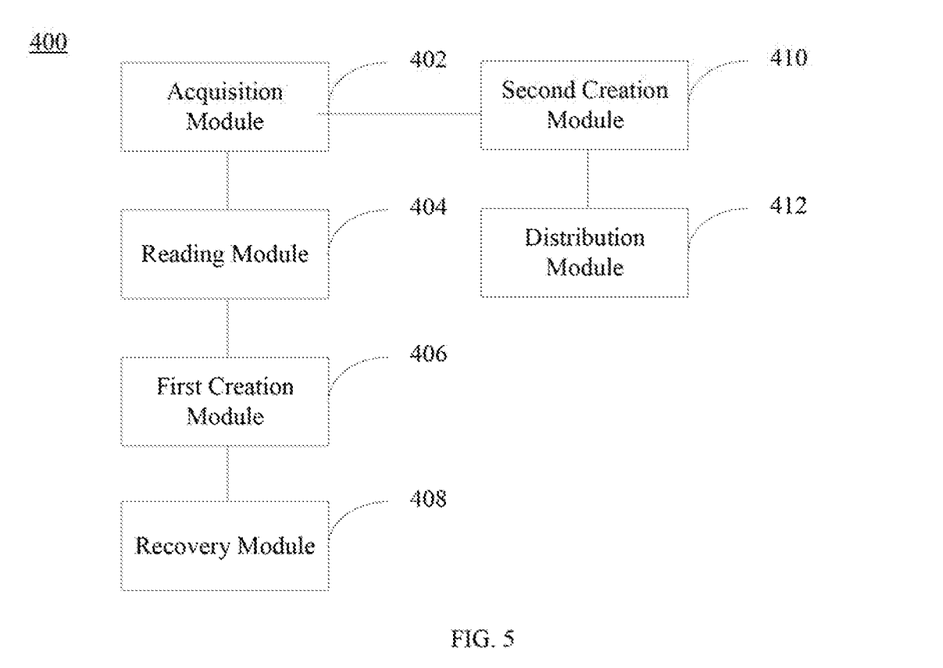
FIG. 5 illustrates a structural diagram of another exemplary system for recovering a virtual network consistent with various embodiments in the present disclosure.

In one embodiment, as shown in FIG. 5, the exemplary system 400 may further include a second creation module 410 and a distribution module 412.

Figure 6:
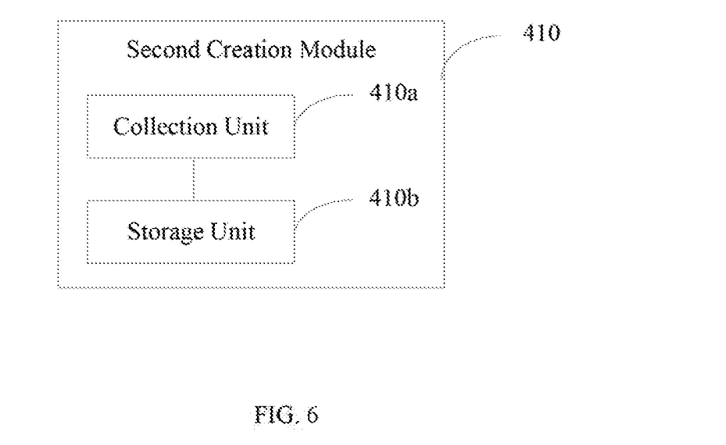
FIG. 6 illustrates a structural diagram of an exemplary second creation module consistent with various embodiments in the present disclosure.

The second creation module 410 may be configured to create a snapshot of the virtual network. In one embodiment, as shown in FIG. 6, the second creation module may further include a collection unit 410a and a storage unit 410b. The collection unit 410a may be configured to, in the preset mode, collect parameters of virtual network devices and connection relationships among the virtual network devices and the virtual machines. The storage unit 410b may be configured to save the parameters and the connection relationships in the form of a snapshot. The virtual network may be configured in various ways, such as using a topology diagram, a command, a table, etc. In one embodiment, the virtual network may be configured using a topology diagram. By creating a snapshot, virtual network configurations that are commonly used or catered to the users may be backed up, and may facilitate virtual network recovery or virtual network deployment afterwards.

Returning to FIG. 5, the distribution module 412 may be configured to distribute a snapshot through a physical network or a physical medium. In one embodiment, the distribution module 412 may be further configured to distribute a snapshot released by the manufacturer through a physical network or a physical medium to a corresponding virtual network; or distribute a snapshot pre-created by a user through a physical network or a physical medium to a corresponding virtual network. The distribution module 412 may be configured to distribute the snapshot in various ways, such as network sharing, making physical medium copies, etc.

The snapshots released by the manufacturer may facilitate the users to recover or deploy the virtual network with default virtual network configurations, and may ensure the smooth operation of the virtual network. The snapshot pre-created by the user may be used by the user himself/herself, and may be shared to other users. That is, the virtual network recovery or deployment may be carried out conveniently according to user habits. Further, the snapshots may be shared with other users.

Figure 7:
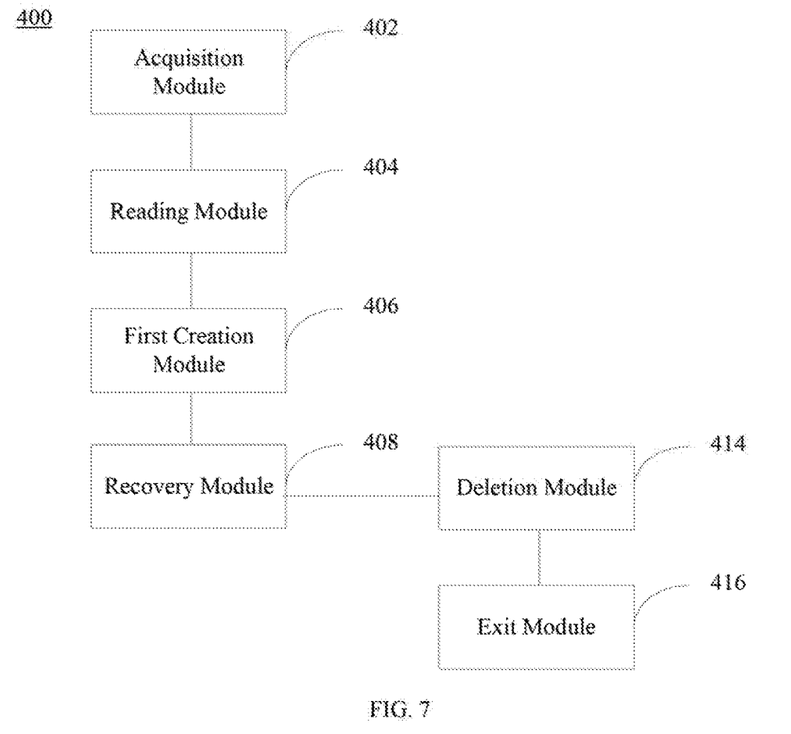
FIG. 7 illustrates a structural diagram of another exemplary system for recovering a virtual network consistent with various embodiments in the present disclosure.

In one embodiment, as shown in FIG. 7, the exemplary system 400 may further include a deletion module 414 and an exit module 416. The deletion module 414 may be configured to delete the to-be-changed virtual network device. The exit module 416 may be configured to exit the preset mode.

In one embodiment, the deletion module 414 may delete the to-be-changed virtual network devices to save storage space. When the exit module 416 instructs the virtual network to exit the preset mode, the virtual network may resume operation at the recovered state. Further, if the virtual network is configured using a topology diagram, when the previously-described connections are established, relative position relationships of the virtual network devices in the topology diagram may be configured according to the snapshot, thus the virtual network may be recovered completely.

Figure 8:
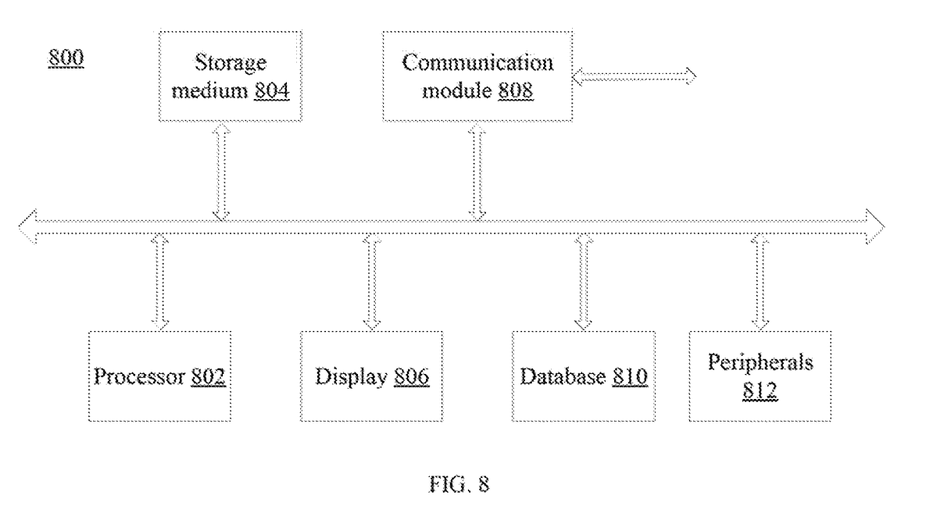
FIG. 8 illustrates a block diagram of an exemplary computer system consistent with various embodiments in the present disclosure.

The system 100 for implementing the virtual network recovery method, the system 400 for recovering a virtual network, the virtual network devices, the virtual machines, and the cloud server may be implemented on any appropriate computing platform including one or more computer systems. FIG. 8 illustrates a block diagram of an exemplary computer system 800 consistent with the disclosed embodiments.

As shown in FIG. 8, computer system 800 may include a processor 802, a storage medium 804, a monitor 806, a communication module 808, a database 810, and peripherals 812. Certain devices may be omitted and other devices may be included.

Processor 802 may include any appropriate processor or processors. Further, processor 802 can include multiple cores for multi-thread or parallel processing. Storage medium 804 may include memory modules, such as Read-only memory (ROM), Random Access Memory (RAM), flash memory modules, and erasable and rewritable memory, and mass storages, such as CD-ROM, U-disk, and hard disk, etc. Storage medium 804 may store computer programs for implementing various processes, when executed by processor 802.

Further, peripherals 812 may include I/O devices such as keyboard and mouse, and communication module 808 may include network devices for establishing connections through the communication network. Database 810 may include one or more databases for storing certain data and for performing certain operations on the stored data, such as database searching.

In operation, the computer system 800 may implement the system 100 which can maintain a virtual network, realize various functionalities of a virtual network, receive user interactions, create and manage virtual network devices in the virtual network, stores and reads configuration information in snapshots, and perform rollback process based on a snapshot. The computer system 800 may implement the system 400 for recovering a virtual network. The virtual machines and the virtual network devices may also be implemented by the computer system 800.

In various embodiments, the disclosed modules for the exemplary system as depicted above can be configured in one device or configured in multiple devices as desired. The modules disclosed herein can be integrated in one module or in multiple modules for processing messages. Each of the modules disclosed herein can be divided into one or more sub-modules, which can be recombined in any manners.

The disclosed embodiments are examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software only or a combination of hardware and software. The software can be stored in a storage medium. The software can include suitable commands to enable any client device (e.g., a smart terminal, a server, or a network device, etc.) to implement the disclosed embodiments.

Accordingly, the present disclosure provides a method and system for recovering a virtual network. A snapshot of a virtual network may be obtained. Configuration information of the virtual network may be obtained from the snapshot. Virtual network devices may be created based on the configuration information, and corresponding parameters of the created virtual network devices may be distributed. The to-be-changed virtual network devices may be disconnected with virtual machines and physical network. The created virtual network devices may be connected to virtual machines and the physical network based on the snapshot. The configuration information may be obtained in the preset mode to void network configuration changes made by users during the snapshot rollback process, ensuring the users to get the desired rollback snapshot. According to the configuration information obtained from the snapshot, virtual network devices may be created and corresponding parameters may be distributed. Further, the to-be-changed virtual network devices may be disconnected with virtual machines and physical network. The created virtual network devices may be connected with the virtual machines and the physical network according to the snapshot. Thus, the virtual network may be quickly recovered according to a saved snapshot.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for recovering a virtual network, comprising:
   obtaining a snapshot of a virtual network, the virtual network including one or more virtual network devices, wherein a virtual network device is connected with at least one of another virtual network device and one or more virtual machines, and the virtual network is connected to a physical network through the one or more virtual network devices;
   entering into a preset mode which prohibits a user from changing the one or more virtual network devices included in the virtual network;
   in the preset mode, reading configuration information of the virtual network from the snapshot;
   in the preset mode, based on the configuration information, creating one or more virtual network devices and distributing configuration parameters included in the configuration information to the one or more created virtual network devices;
   disconnecting one or more target virtual network devices of the virtual network from the one or more virtual machines and the physical network, wherein the one or more target virtual network devices includes at least one of a virtual network device that needs an adjustment or a reset based on a user input, or a virtual network device that needs an adjustment or a reset according to a network error; and
   based on the snapshot, connecting the one or more created virtual network devices to the one or more virtual machines and the physical network.

2. The method according to claim 1, before obtaining a snapshot of the virtual network, further comprising:
   creating a snapshot of the virtual network.

3. The method according to claim 2, wherein creating a snapshot of the virtual network further comprises:
   in the preset mode, collecting configuration parameters of virtual network devices in the virtual network and connection relationships among the virtual network devices and the virtual machines; and
   saving the collected configuration parameters and the collected connection relationships in a form of snapshot.

4. The method according to claim 2, further comprising:
   distributing the snapshot of the virtual network via the physical network or a physical medium.

5. The method according to claim 4, wherein distributing the snapshot of the virtual network further comprises:
   distributing the snapshot of the virtual network released by a manufacturer to a corresponding virtual network via the physical network or the physical medium.

6. The method according to claim 4, wherein distributing the snapshot of the virtual network further comprises:
   distributing the snapshot of the virtual network pre-created by a user to a corresponding virtual network via the physical network or the physical medium.

7. The method according to claim 1, after connecting the one or more created virtual network devices to a virtual machine and a physical network, further comprising:
   deleting the one or more target virtual network devices; and
   exiting the preset mode.

8. A system for recovering a virtual network, comprising one or more processors configured to:
   obtain a snapshot of the virtual network, the virtual network including one or more virtual network devices, wherein a virtual network device is connected with at least one of another virtual network device and one or more virtual machines, and the virtual network is connected to a physical network through the one or more virtual network devices;
   enter into a preset mode which prohibits a user from changing the one or more virtual network devices included in the virtual network;
   in the preset mode, read configuration information of the virtual network from the snapshot;
   in the preset mode, based on the configuration information, create one or more virtual network devices and distribute configuration parameters included in the configuration information to the one or more created virtual network devices;
   disconnect one or more target virtual network devices of the virtual network from the one or more virtual machines and the physical network, wherein the one or more target virtual network devices includes at least one of a virtual network device that needs an adjustment or a reset based on a user input, or a virtual network device that needs an adjustment or a reset according to a network error; and
   based on the snapshot, connect the one or more created virtual network devices to the one or more virtual machines and the physical network.

9. The system according to claim 8, wherein before obtaining a snapshot of the virtual network, the one or more processors are further configured to:
   create a snapshot of the virtual network.

10. The system according to claim 9, wherein the one or more processors are further configured to:
    in the preset mode, collect configuration parameters of virtual network devices in the virtual network and connection relationships among the virtual network devices and the virtual machines; and
    save the collected configuration parameters and the collected connection relationships in a form of snapshot.

11. The system according to claim 9, wherein the one or more processors are further configured to:
    distribute the snapshot of the virtual network via the physical network or a physical medium.

12. The system according to claim 11, wherein the one or more processors are further configured to:
    distribute the snapshot of the virtual network released by a manufacturer to a corresponding virtual network via the physical network or the physical medium.

13. The system according to claim 11, wherein the one or more processors are further configured to:
    distribute the snapshot of the virtual network pre-created by a user to a corresponding virtual network via the physical network or the physical medium.

14. The system according to claim 8, wherein after connecting the one or more created virtual network devices to a virtual machine and a physical network, the one or more processors are further configured to:
    delete the one or more target virtual network devices; and
    exit the preset mode.

15. The method according to claim 1, wherein reading the configuration information of the virtual network comprises:
    when the virtual network is configured using a topology diagram, obtaining relative positions of the one or more target virtual network devices in the topology diagram.

16. The method according to claim 1, further comprising:
if one of the one or more virtual network devices is not created successfully, exiting the preset mode and informing that the recovery of the virtual network is failed.

17. The method according to claim 1, wherein:
the preset mode prohibits the user from adding or deleting the one or more virtual network devices and prohibits the user from changing parameters of the configuration information of the one or more virtual network devices externally; and in the preset mode, virtual network devices existing in the virtual network run and function normally.

\* \* \* \* \*